(12) United States Patent
Liu et al.

(10) Patent No.: US 12,722,528 B2
(45) Date of Patent: Sep. 1, 2026

(54) BI-CAPACITOR DESIGN FOR FAST STATE OF CHARGE EQUALIZATION

(71) Applicant: GM GLOBAL TECHNOLOGY OPERATIONS LLC, Detroit, MI (US)

(72) Inventors: Jingyuan Liu, Shanghai (CN); Qili Su, Shanghai (CN); Dave G. Rich, Sterling Heights, MI (US); Si Chen, Shanghai (CN); James Morrison, Sebringville (CA); Dewen Kong, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 611 days.

(21) Appl. No.: 18/359,411

(22) Filed: Jul. 26, 2023

(65) Prior Publication Data

US 2024/0270121 A1 Aug. 15, 2024

(30) Foreign Application Priority Data

Feb. 13, 2023 (CN) ......................... 202310110029.4

(51) Int. Cl.
*B60L 58/22* (2019.01)
*B60L 58/12* (2019.01)
*B60L 58/19* (2019.01)

(52) U.S. Cl.
CPC ............... *B60L 58/22* (2019.02); *B60L 58/12* (2019.02); *B60L 58/19* (2019.02); *B60L 2240/547* (2013.01)

(58) Field of Classification Search
CPC .......... B60L 58/22; B60L 58/19; B60L 58/12; B60L 2240/547

(Continued)

(56) References Cited

U.S. PATENT DOCUMENTS 8,487,590 B2 * 7/2013 Kudo ........................ H02J 7/54 320/122
2014/0191692 A1 * 7/2014 Chuang ..................... H02P 9/00 318/139

(Continued)

FOREIGN PATENT DOCUMENTS

CN 112072731 A 12/2020
DE 10236165 A1 2/2004

OTHER PUBLICATIONS

Office Action dated Nov. 13, 2023 from German Office Action for German Application No. 10 2023 106 550.5; 8 pages.

(Continued)

*Primary Examiner* — Michael G Lee
*Assistant Examiner* — David Tardif

(57) ABSTRACT

A state of charge (SOC) balancing system includes: first and second batteries; first and second capacitors; an SOC module configured to determine first and second SOCs of the first and second batteries, respectively; and a switching module configured to selectively, when the first SOC is greater than the second SOC: (i) electrically connect the first and second capacitors in parallel; (ii) electrically connect the first battery to the first and second capacitors while the first and second capacitors are electrically connected in parallel; (iii) electrically disconnect the first battery from the first and second capacitors; (iv) electrically connect the first and second capacitors in series; (v) electrically connect the second battery to the first and second capacitors while the first and second capacitors are electrically connected in series; and (vi) electrically disconnect the second battery from the first and second capacitors.

20 Claims, 15 Drawing Sheets

(58) Field of Classification Search
USPC .......................................................... 320/104
See application file for complete search history.

(56) References Cited

U.S. PATENT DOCUMENTS

| | | | | |
|---|---|---|---|---|
| 2020/0298722 | A1* | 9/2020 | Smolenaers | B60L 53/24 |
| 2022/0190395 | A1* | 6/2022 | Namuduri | H01M 10/4235 |
| 2023/0361591 | A1* | 11/2023 | Arisetty | H02J 7/82 |
| 2023/0396090 | A1* | 12/2023 | Kang | H02J 7/56 |
| 2024/0042895 | A1* | 2/2024 | Kang | B60K 6/48 |
| 2024/0100991 | A1* | 3/2024 | Bloom | B60L 58/16 |
| 2024/0375526 | A1* | 11/2024 | Vergossen | H01M 8/249 |

OTHER PUBLICATIONS

Samanta, A., and Chowdhuri, S. "Active Cell Balancing of Lithium-ion Battery Pack Using Dual DC-DC Converter and Auxiliary Lead-acid Battery", Journal of Energy Storage, 33, 102109., 2021.

* cited by examiner 100
102
108
110
112
114
116
118
120
122
124
126
128
130
134
140
142
148
150
158
160-1
160-2
162
164
170
172
180
182
184
186
190
192
193
194
195
196
198
200
202
204
206

720
748
724
722
728
752
718

744
740
736
740
740
740
732
732
732
732
732
240
716
712
708
704-1
704-2
704-3
704-4
Load

BI-CAPACITOR DESIGN FOR FAST STATE OF CHARGE EQUALIZATION

CROSS-REFERENCE TO RELATED APPLICATIONS

This application claims the benefit of Chinese Patent Application No. 202310110029.4, filed on Feb. 13, 2023. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to batteries and more particularly to battery systems and methods involving capacitors for state of charge equalization.

Some types of vehicles include only an internal combustion engine that generates propulsion torque. Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine. The present application is applicable to electric vehicles, hybrid vehicles, and other types of vehicles.

SUMMARY

In a feature, a state of charge (SOC) balancing system includes: a first battery having a first positive terminal and a first negative terminal; a second battery having a second positive terminal and a second negative terminal and connected in series with the first battery; a first switch configured to connect and disconnect the first positive terminal to and from a first node; a second switch configured to connect and disconnect the second positive terminal to and from the first node; a third switch configured to connect and disconnect the first negative terminal to and from a second node; a fourth switch configured to connect and disconnect the second negative terminal to and from the second node; a first capacitor having a first end connected to the first node and a second end connected to a third node; a fifth switch configured to connect and disconnect the first node to and from a fourth node; a sixth switch configured to connect and disconnect the fourth node to and from the third node; a seventh switch configured to connect and disconnect the third node to and from the second node; a second capacitor having a first end connected the fourth node and a second end connected to the second node; a state of charge module configured to determine first and second states of charge of the first and second batteries, respectively; and a switching module configured to selectively, when the first SOC of the first battery is greater than the second SOC of the second battery: (i) close the fifth and seventh switches, close the first and third switches, and open the second, fourth, and sixth switches; (ii) after (i), open the fifth, seventh, first, and third switches; (iii) after (ii), close the sixth switch, close the second and fourth switches, and open the first, third, fifth, and seventh switches; and (iv) after (iii), open the first, second, third, fourth, fifth, sixth, and seventh switches.

In further features, the switching module is configured to perform (i)-(iv) when the first SOC of the first battery is greater than the second SOC of the second battery by at least a first predetermined SOC.

In further features, the switching module is configured to repeat (i)-(iv) when a difference between the first SOC and the second SOC is greater than a second predetermined SOC after (iv).

In further features, the first predetermined SOC is greater than the second predetermined SOC.

In further features, the switching module is configured to repeat (i)-(iv) until the difference between the first SOC and the second SOC is less than the second predetermined SOC after (iv).

In further features: the first battery is a first battery cell; and the second battery is a second battery cell.

In further features: the first battery is a first battery string including a first plurality of battery cells; and the second battery is a second battery string including a second plurality of battery cells.

In further features: the first battery is a first battery module including a first plurality of battery cells; and the second battery is a second module including a second plurality of battery cells.

In further features: the first capacitor is a first capacitor assisted battery (CAB); and the second capacitor is a second CAB.

In a feature, a state of charge (SOC) balancing system includes: a first battery; a second battery; a first capacitor; a second capacitor; a state of charge module configured to determine first and second states of charge of the first and second batteries, respectively; and a switching module configured to selectively, when the first SOC of the first battery is greater than the second SOC of the second battery: (i) electrically connect the first and second capacitors in parallel; (ii) after (i), electrically connect the first battery to the first and second capacitors while the first and second capacitors are electrically connected in parallel; (iii) after (ii), electrically disconnect the first battery from the first and second capacitors; (iv) after (iii), electrically connect the first and second capacitors in series; (v) after (iv), electrically connect the second battery to the first and second capacitors while the first and second capacitors are electrically connected in series; and (vi) after (v), electrically disconnect the second battery from the first and second capacitors.

In further features, the switching module is configured to perform (i)-(vi) when the first SOC of the first battery is greater than the second SOC of the second battery by at least a first predetermined SOC.

In further features, the switching module is configured to repeat (i)-(vi) when a difference between the first SOC and the second SOC is greater than a second predetermined SOC after (vi).

In further features, the first predetermined SOC is greater than the second predetermined SOC.

In further features, the switching module is configured to repeat (i)-(vi) until the difference between the first SOC and the second SOC is less than the second predetermined SOC after (vi).

In further features: the first battery is a first battery cell; and the second battery is a second battery cell.

In further features: the first battery is a first battery string including a first plurality of battery cells; and the second battery is a second battery string including a second plurality of battery cells.

In further features: the first battery is a first battery module including a first plurality of battery cells; and the second battery is a second module including a second plurality of battery cells.

In further features: the first capacitor is a first capacitor assisted battery (CAB); and the second capacitor is a second CAB.

In a feature, a state of charge (SOC) balancing method includes: determining first and second states of charge of first and second batteries, respectively, the first battery having a first positive terminal and a first negative terminal and the second battery having a second positive terminal and a second negative terminal and connected in series with the first battery; selectively, when the first SOC of the first battery is greater than the second SOC of the second battery: (i) close fifth and seventh switches, close first and third switches, and open second, fourth, and sixth switches, where: the first switch is configured to connect and disconnect the first positive terminal to and from a first node; the second switch is configured to connect and disconnect the second positive terminal to and from the first node; the third switch is configured to connect and disconnect the first negative terminal to and from a second node; the fourth switch is configured to connect and disconnect the second negative terminal to and from the second node; a first capacitor includes a first end connected to the first node and a second end connected to a third node; the fifth switch is configured to connect and disconnect the first node to and from a fourth node; the sixth switch is configured to connect and disconnect the fourth node to and from the third node; the seventh switch is configured to connect and disconnect the third node to and from the second node; and a second capacitor includes a first end connected the fourth node and a second end connected to the second node; (ii) after (i), open the fifth, seventh, first, and third switches; (iii) after (ii), close the sixth switch, close the second and fourth switches, and open the first, third, fifth, and seventh switches; and (iv) after (iii), open the first, second, third, fourth, fifth, sixth, and seventh switches.

In further features, the method further includes performing (i)-(iv) when the first SOC of the first battery is greater than the second SOC of the second battery by at least a first predetermined SOC.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A battery may include a plurality of battery modules. Each battery module may include a plurality of battery cells, such as pouch battery cells, prismatic battery cells, or a combination of pouch and prismatic battery cells. Prismatic battery cells may be cylindrical or have another suitable shape.

Ideally, the state of charge (SOC) of each battery cell (and module) of a battery are the same. In reality, however, the SOCs of the battery cells (and/or modules) vary, such as due to variation in capacity, different connection resistances, different internal resistances, different temperatures at different positions, and for other reasons. Variations between SOCs may become larger when charging and discharging occurs.

When battery cells (or modules) are electrically connected in series, capacity of the battery depends on the lowest SOC of one of the battery cells. SOC imbalance leads to a waste of energy. SOC imbalance may lead to deeper charge and discharge of certain battery cells (and/or modules) and causing aging at different rates. In some cases, SOC imbalance may lead to overcharge and/or over discharge of cells.

The present application involves a two-capacitor architecture and switches that allow for rapid balancing of SOCs of battery cells (and/or modules).

Figure 1:
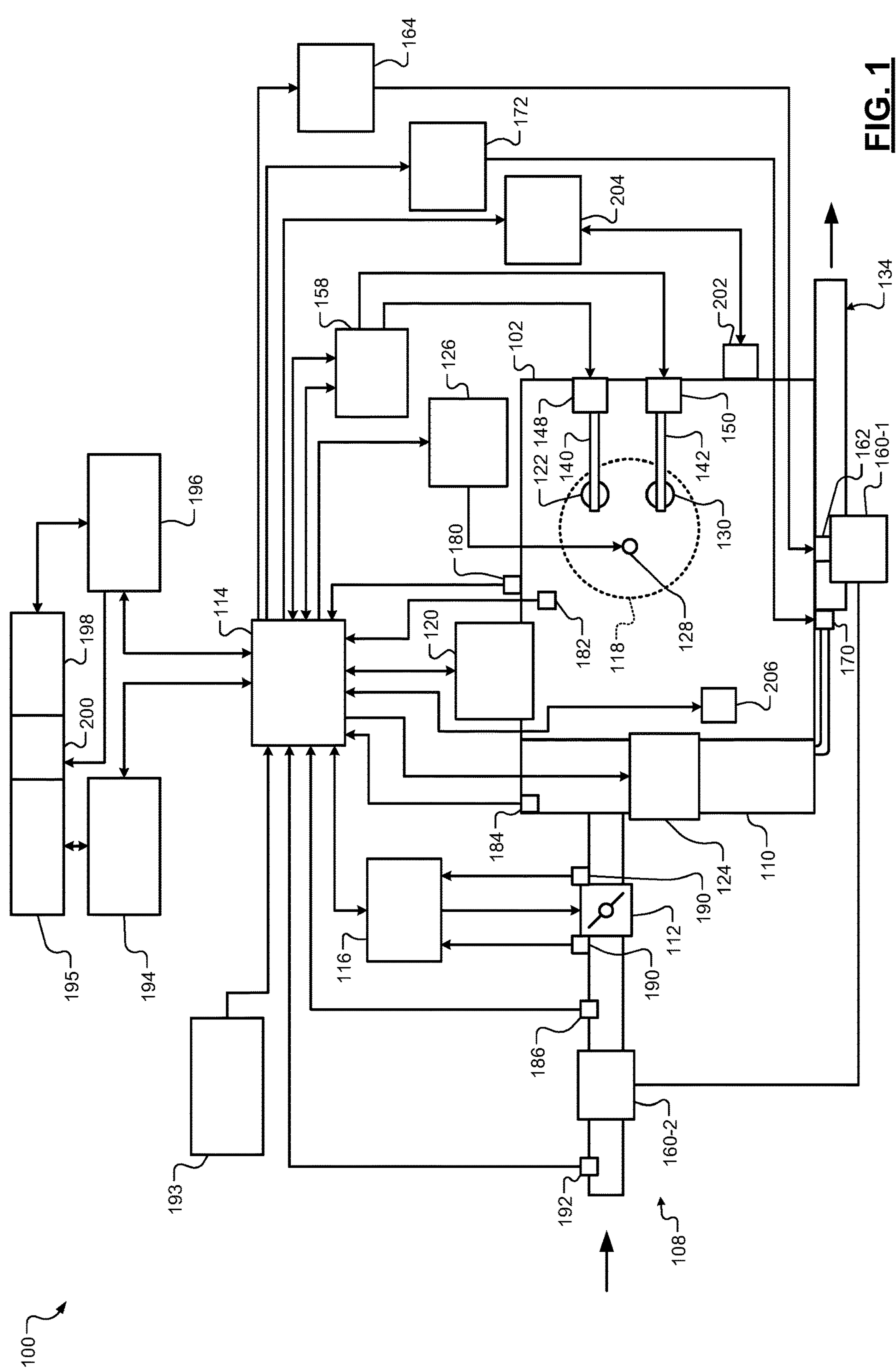
FIG. 1 is a functional block diagram of an example engine control system.

Referring now to FIG. 1, a functional block diagram of an example powertrain system 100 is presented for a hybrid vehicle. While the example of a hybrid vehicle is provided, the present application is applicable to non-vehicle applications that include a battery and other types of vehicles (e.g., electric, internal combustion engine, etc.).

The powertrain system 100 of a vehicle includes an engine 102 that combusts an air/fuel mixture to produce torque. The vehicle may be non-autonomous or autonomous. Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft-based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate (WG) 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and an electric motor 198. While the example of one electric motor is provided, multiple electric motors may be implemented. The electric motor 198 may be a permanent magnet electric motor or another suitable type of electric motor that outputs voltage based on back electromagnetic force (EMF) when free spinning, such as a direct current (DC) electric motor or a synchronous electric motor. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from a battery 208 (FIG. 2) to the electric motor 198 to cause the electric motor 198 to output positive torque. The battery is discussed further below. The electric motor 198 may output torque, for example, to an input shaft of the transmission 195, to an output shaft of the transmission 195, or to another component. A clutch 200 may be implemented to couple the electric motor 198 to the transmission 195 and to decouple the electric motor 198 from the transmission 195. One or more gearing devices may be implemented between an output of the electric motor 198 and an input of the transmission 195 to provide one or more predetermined gear ratios between rotation of the electric motor 198 and rotation of the input of the transmission 195. In various implementations, the electric motor 198 may be omitted. In vehicles, such as electric vehicles and autonomous vehicles, the battery 208 can be used to supply self redundant power to various systems, such as automotive safety integrity level (ASIL) systems, advanced driver assistant systems (ADAS), and other systems as well as serve multiple output voltages (e.g., 12 and 48 volts).

The ECM 114 starts the engine 102 via a starter motor 202. The ECM 114 or another suitable module of the vehicle engages the starter motor 202 with the engine 102 for an engine startup event. For example only, the ECM 114 may engage the starter motor 202 with the engine 102 when a key ON command is received. A driver may input a key ON command, for example, via actuating one or more ignition keys, buttons, and/or switches of the vehicle or of a key fob of the vehicle. The starter motor 202 may engage a flywheel coupled to the crankshaft or one or more other suitable components that drive rotation of the crankshaft.

The ECM 114 may also start the engine in response to an auto-start command during an auto-stop/start event or to an engine start command for a sailing event. Auto-stop/start events include shutting down the engine 102 while the vehicle is stopped, the driver has depressed the brake pedal, and the driver has not input a key OFF command. An auto-start command may be generated while the engine 102 is shut down for an auto-stop/start event, for example, when a driver releases the brake pedal and/or depresses the accelerator pedal.

Sail events may include the ECM 114 shutting down the engine 102 when the vehicle is moving (e.g., vehicle speed greater than a predetermined speed, such as 50 miles per hour), the driver is not applying pressure to the accelerator pedal, and the driver has not input a key OFF command. An engine start command may be generated while the engine

102 is shut down for a sail event, for example, when a driver depresses the accelerator pedal. The driver may input a key OFF command, for example, via actuating the one or more ignition keys, buttons, and/or switches, as discussed above.

A starter motor actuator, such as a solenoid, may actuate the starter motor 202 into engagement with the engine 102. For example only, the starter motor actuator may engage a starter pinion with a flywheel coupled to the crankshaft. In various implementations, the starter pinion may be coupled to the starter motor 202 via a driveshaft and a one-way clutch. A starter actuator module 204 controls the starter motor actuator and the starter motor 202 based on signals from a starter control module, as discussed further below. In various implementations, the starter motor 202 may be maintained in engagement with the engine 102.

In response to a command to start the engine 102 (e.g., an auto-start command, an engine start command for an end of a sail event, or when a key ON command is received), the starter actuator module 204 supplies current to the starter motor 202 to start the engine 102. The starter actuator module 204 may also actuate the starter motor actuator to engage the starter motor 202 with the engine 102. The starter actuator module 204 may supply current to the starter motor 202 after engaging the starter motor 202 with the engine 102, for example, to allow for teeth meshing.

The application of current to the starter motor 202 drives rotation of the starter motor 202, and the starter motor 202 drives rotation of the crankshaft (e.g., via the flywheel). The period of the starter motor 202 driving the crankshaft to start the engine 102 may be referred to as engine cranking.

The starter motor 202 draws power from the battery 208 to start the engine 102. Once the engine 102 is running after the engine startup event, the starter motor 202 disengages or is disengaged from the engine 102, and current flow to the starter motor 202 may be discontinued. The engine 102 may be considered running, for example, when an engine speed exceeds a predetermined speed, such as a predetermined idle speed. For example only, the predetermined idle speed may be approximately 700 revolutions per minute (rpm) or another suitable speed. Engine cranking may be said to be completed when the engine 102 is running.

A generator 206 converts mechanical energy of the engine 102 into alternating current (AC) power. For example, the generator 206 may be coupled to the crankshaft (e.g., via gears or a belt) and convert mechanical energy of the engine 102 into AC power by applying a load to the crankshaft. The generator 206 rectifies the AC power into DC power and stores the DC power in the battery 208. Alternatively, a rectifier that is external to the generator 206 may be implemented to convert the AC power into DC power. The generator 206 may be, for example, an alternator. In various implementations, such as in the case of a belt alternator starter (BAS), the starter motor 202 and the generator 206 may be implemented together. In various implementations, one or more direct current (DC) to DC converters may be implemented.

Figure 2:
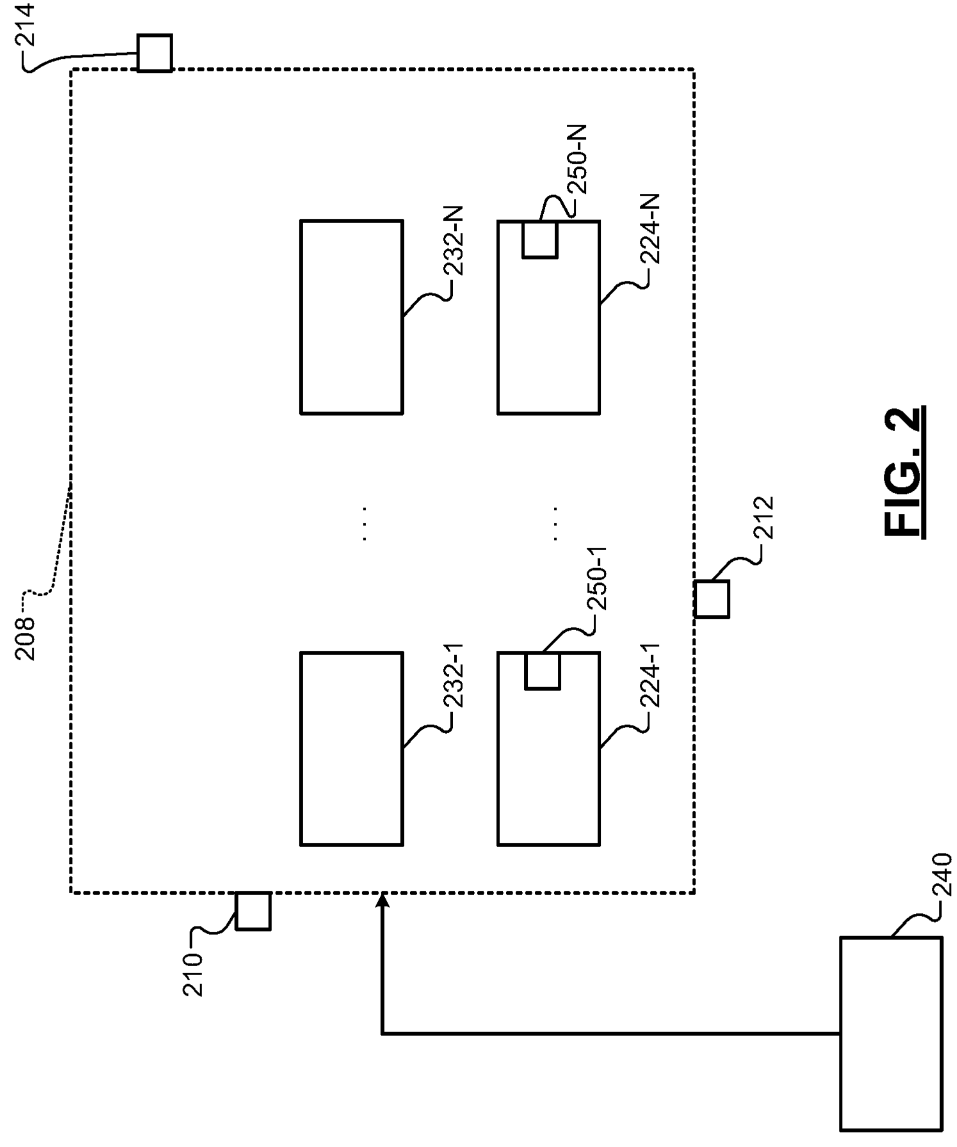
FIG. 2 is a functional block diagram an example battery system of a vehicle.

FIG. 2 is a functional block diagram of an example battery system of the vehicle. The battery 208 may have at least two (positive) output terminals and a negative terminal to provide at least two direct current (DC) operating voltages. For example only, the battery 208 may have a first positive (e.g., 48 Volt (V) nominal) terminal 210, a negative terminal 212, and a second positive (e.g., 12 V nominal) terminal 214. While the example of the battery 208 having a 48 V nominal operating voltage and a 12 V nominal operating voltage is provided, the battery 208 may have one or more other operating voltages.

The battery 208 may include a plurality of battery modules, such as a first battery module 224-1, . . . , and an N-th battery module 224-N ("battery modules 224"), where N is an integer greater than or equal to 2. In various implementations, N may be equal to 2, 3, 4, 5, 6, 8, 10, 12, or another suitable number.

As discussed further below with respect to FIG. 4, each of the battery modules 224 includes multiple battery strings. Each battery string may be individually replaceable. Each battery module may also be individually replaceable. The ability to individually replace the battery strings and/or modules may enable the battery 208 to include a shorter warranty period and have a lower warranty cost. The battery strings and modules are also individually isolatable, for example, in the event of a fault in a battery string. In various implementations, the battery 208 may have the form factor of a standard automotive grade 12 V battery.

The battery 208 includes a plurality of switches, such as first switches 232-1, . . . , N-th switches 232-N (collectively "switches 232"). The switches 232 enable the battery strings of the battery modules 224 to be connected in series, parallel, or combinations of series and parallel to provide target output voltages and capacities at the output terminals.

A switch control module 240 controls the switches 232 to provide desired output voltages and capacities at the output terminals. The switch control module 240 may control the switches 232 to as closely as possible balance the state of charges (SOCs) of the battery strings, as discussed further below. The switch control module 240 may also control the switches 232 based on balancing temperatures of the battery strings of each battery module and temperatures of the battery modules.

Figure 3A:
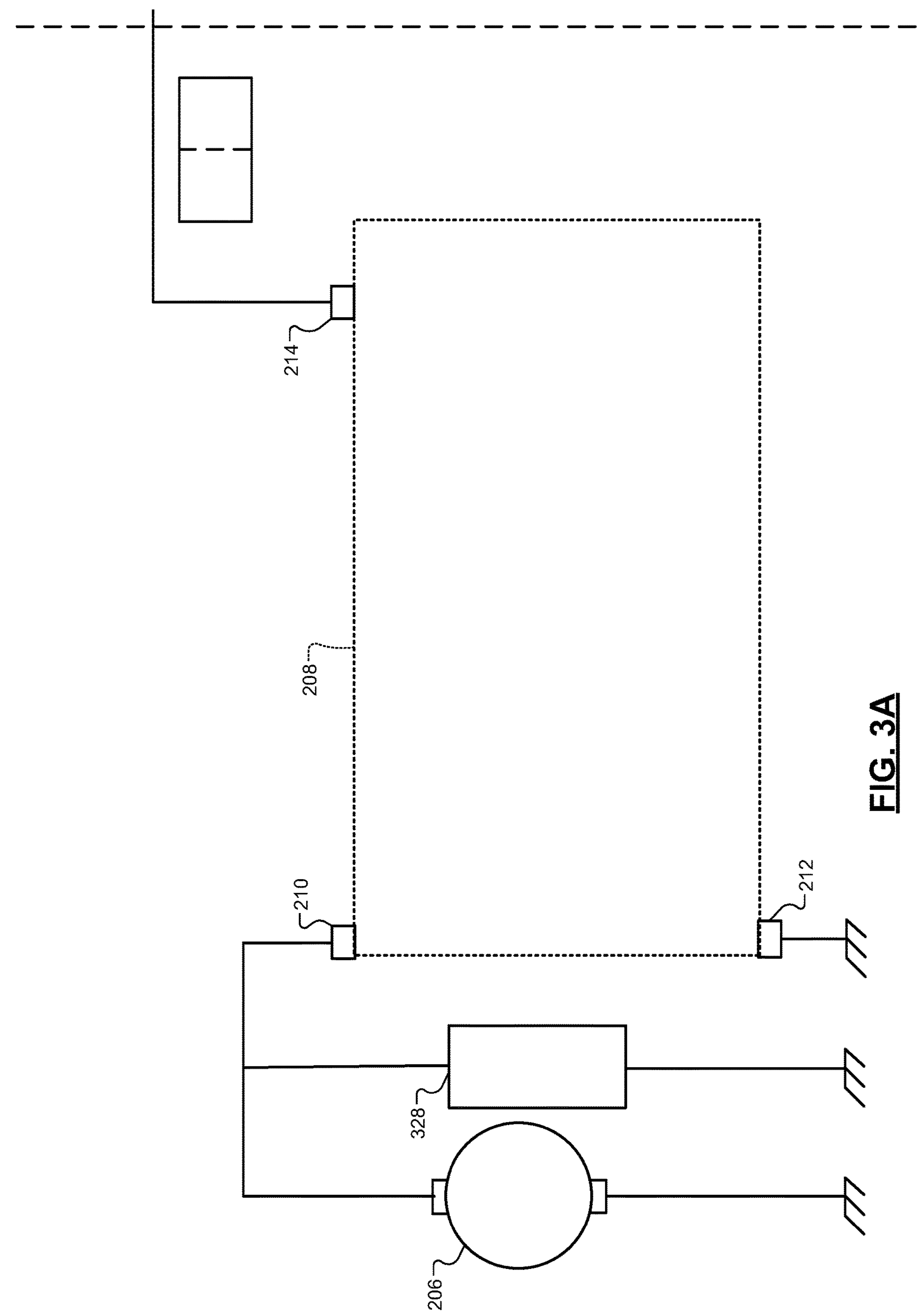
FIGS. 3A-3B are a schematic including an example implementation of a battery system.
Figure 3B:
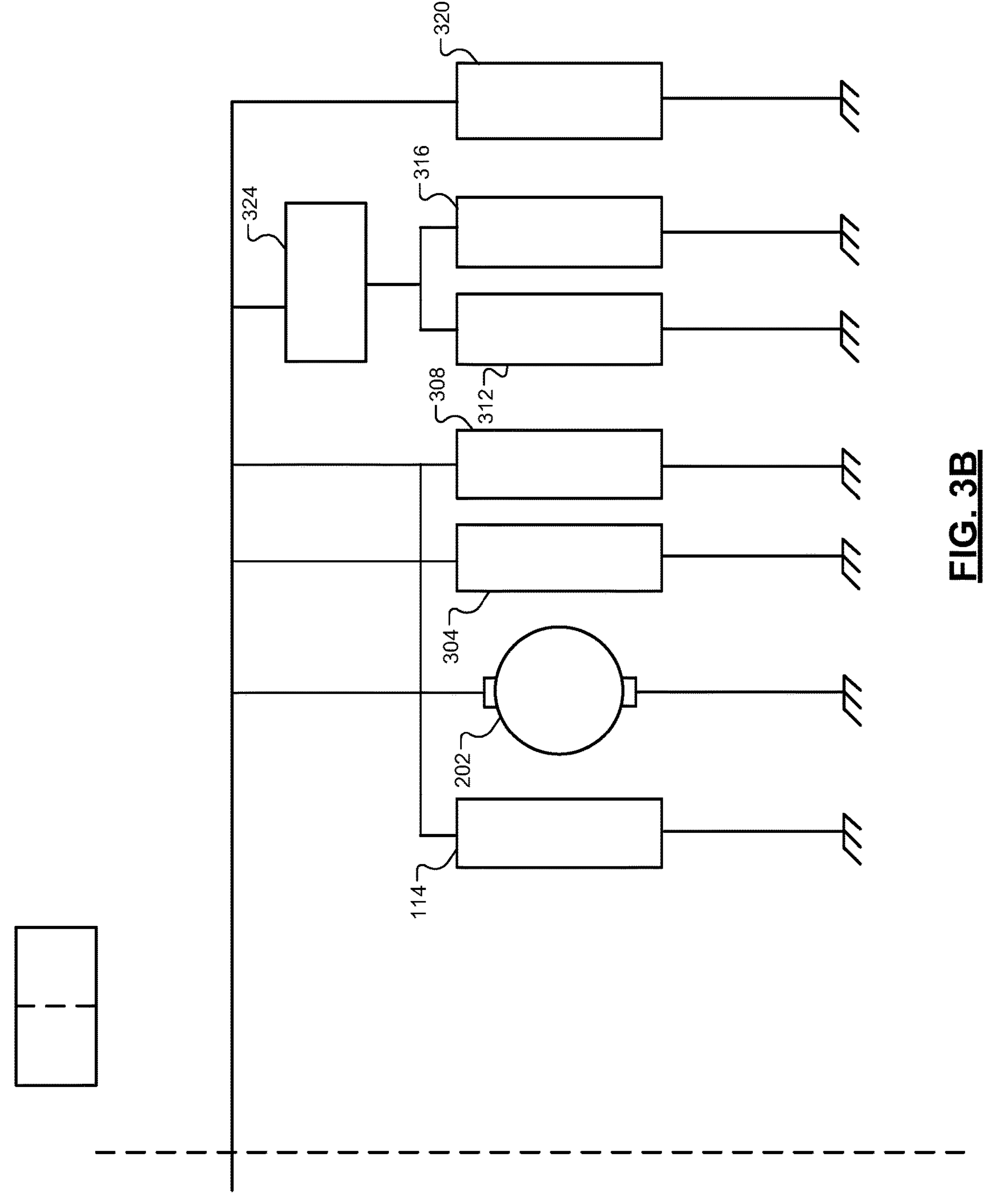

FIGS. 3A-3B are a schematic including an example battery system including the battery 208. Sets of the battery strings are connectable in series (via ones of the switches 232 (e.g., FIG. 2)) to the first positive terminal 210 and the negative terminal 212 to provide a first nominal output voltage (e.g., 48 V) via the first positive terminal 210. Individual ones of the battery strings can be connected (via ones of the switches 232) to the second positive terminal 214 and the negative terminal 212 to provide a second nominal output voltage (e.g., 12 V) via the second positive terminal 214. How many of the battery strings are connected to the first positive terminal 210 and the second positive terminal 214 dictates the portions of the overall capacity of the battery 208 available at each of the positive terminals.

As shown in FIG. 3B, a first set of vehicle electrical components operates using one of the two or more operating voltages of the battery 208. For example, the first set of vehicle electrical components may be connected to the second positive terminal 214. The first set of vehicle electrical components may include, for example but not limited to, the ECM 114 and other control modules of the vehicle, the starter motor 202, and/or other electrical loads, such as first 12 V loads 304, second 12 V loads 308, other control modules 312, third 12 V loads 316, and fourth 12 V loads 320. In various implementations, a switching device 324 may be implemented.

As shown in FIG. 3A, a second set of vehicle electrical components operates using another one of the two or more operating voltages of the battery 208. For example, the second set of vehicle electrical components may be connected to the first positive terminal 210. The second set of vehicle electrical components may include, for example but not limited to, the generator 206 and various electrical loads, such as 48 V loads 328. The generator 206 may be controlled to charge the battery 208.

Each of the switches 232 may be an insulated gate bipolar transistor (IGBT), a field effect transistor (FET), such as a metal oxide semiconductor FET (MOSFET), or another suitable type of switch.

Figure 4:
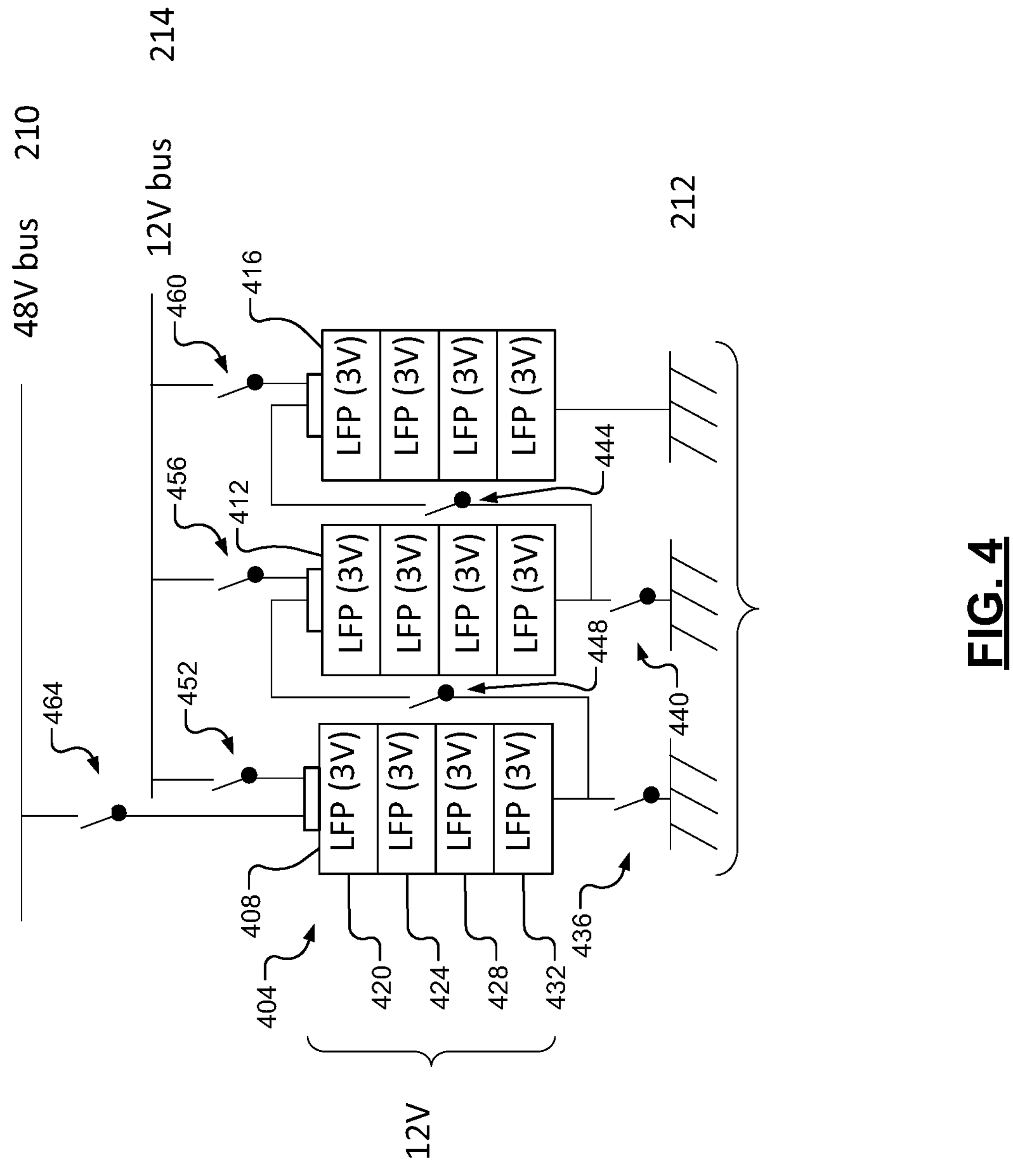
FIG. 4 is a functional block diagram of an example implementation of one battery module in an open (X) configuration.

FIG. 4 is a functional block diagram of an example implementation of one of the battery modules 224, numbered battery module 404, and one set of the switches 232. Each of the battery modules 224 may be identical to 404, and each set of the switches 232 may be connected identically to that of 404.

The battery module 404 may include three battery strings, 408, 412, and 416. The battery strings 408-416 may be identical and each include four battery cells 420, 424, 428, and 432 or another suitable number of battery cells. The battery cells 420-432 are connected in series to provide the second operating voltage (e.g., 12 V). Each of the battery cells 420-432 may be, for example, a 3 V battery cell or have another suitable voltage to provide the second operating voltage when the battery cells 420-432 are connected in series. The battery cells 420-432 may be, for example lithium ferrophosphate (LFP) battery cells or have another suitable chemistry.

Negative terminals of the battery strings 408-416 are connected to the negative terminal 212. The negative terminals of the battery strings 408 and 412 are connected to the negative terminal 212 via switches 436 and 440, respectively, when the switches 436 and 440 are closed. The switches 436 and 440 can open to disconnect the negative terminals of the battery strings 408 and 412 from the negative terminal 212. The negative terminal of the battery string 416 may be directly connected to the negative terminal 212.

The positive terminal of the battery string 416 is connected to the negative terminal of the battery string 412 such that the battery strings 412 and 416 are connected in series when switch 444 is closed. The switch 444 can be opened to disconnect the positive terminal of the battery string 416 from the negative terminal of the battery string 412. The positive terminal of the battery string 412 is connected to the negative terminal of the battery string 408 such that the battery strings 412 and 408 are connected in series when switch 448 is closed. The switch 448 can be opened to disconnect the positive terminal of the battery string 412 from the negative terminal of the battery string 408.

Switches 452, 456, and 460 respectively connect and disconnect the positive terminals of the battery strings 408, 412, and 416 to and from a first bus (e.g., 12 V bus) that is connected to the second positive terminal 214. Switch 464 connects and disconnects the positive terminal of the battery string 408 to and from a second bus (e.g., a 48 V bus) that is connected to the first positive terminal 210.

The switch control module 240 controls switching of the switches of each of the battery modules 224 (the set of switches). At any given time, the switch control module 240 may actuate the switches associated with a battery module such that the battery module is in an open (X) configuration, a series (S) configuration, or a parallel (P) configuration. FIG. 4 includes an example illustration of the battery module 404 in the open (X) configuration. When a battery module is in the open (X) configuration, all the battery strings of the battery module are disconnected from both the first positive terminal 210 and the second positive terminal 214.

Figure 5:
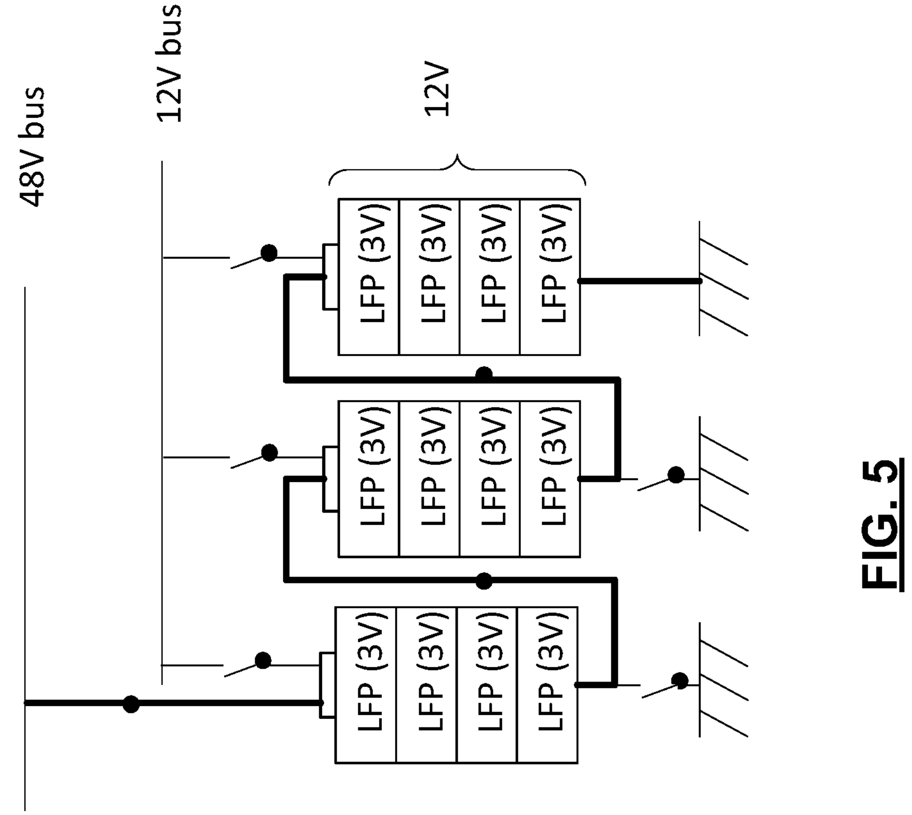
FIG. 5 includes an example illustration of the battery module in a series (S) configuration.

FIG. 5 includes an example illustration of the battery module 404 in the series (S) configuration. When a battery module is in the series (S) configuration, all of the battery strings of the battery module are connected in series and to the first positive terminal 210. This is accomplished by closing switches 444, 448, and 464, and opening all of the other switches 436, 440, 452, 456, 460. None of the battery strings is connected to the second positive terminal 214 when the battery module is in the series (S) configuration.

Figure 6:
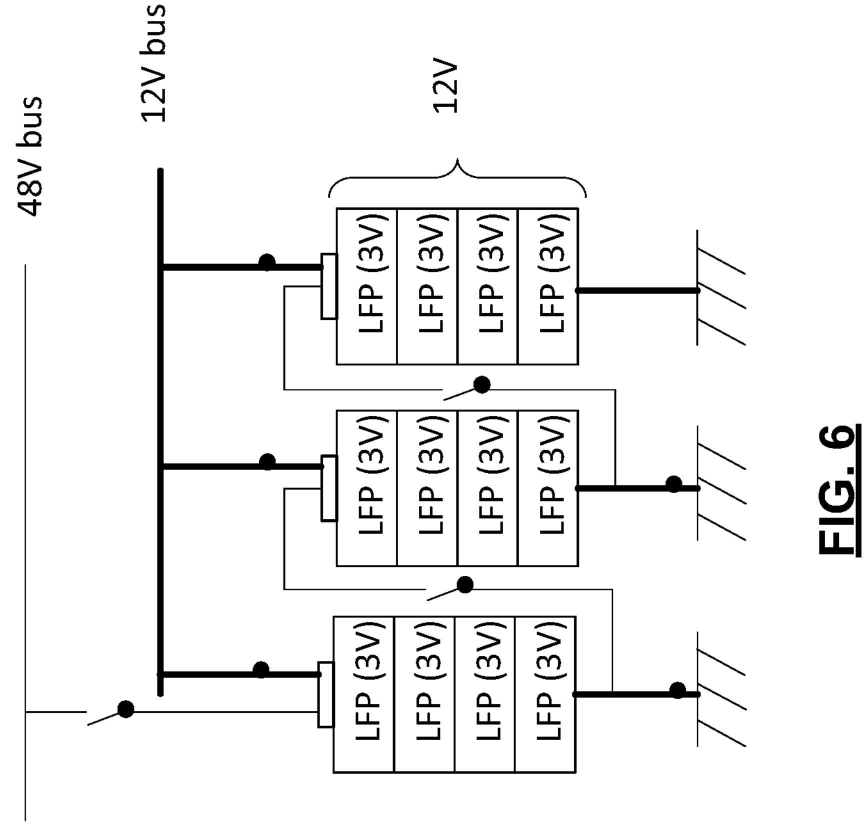
FIG. 6 includes an example illustration of the battery module in a parallel (P) configuration.

FIG. 6 includes an example illustration of the battery module 404 in the parallel (P) configuration. When a battery module is in the parallel (P) configuration, all the battery strings of the battery module are connected in parallel to the second positive terminal 214. This is accomplished by closing switches 452, 456, 460, 436, and 440, and opening all of the other switches 444, 448, and 464. None of the battery strings is connected to the first positive terminal 210 when the battery module is in the parallel (P) configuration.

As illustrated in FIG. 2, each of the battery modules 224 also includes a plurality of temperature sensors, such as temperature sensors 250-1, . . . , 250-N. For example, one battery temperature sensor may be provided for each battery string and measure a temperature of that battery string.

Figure 7:
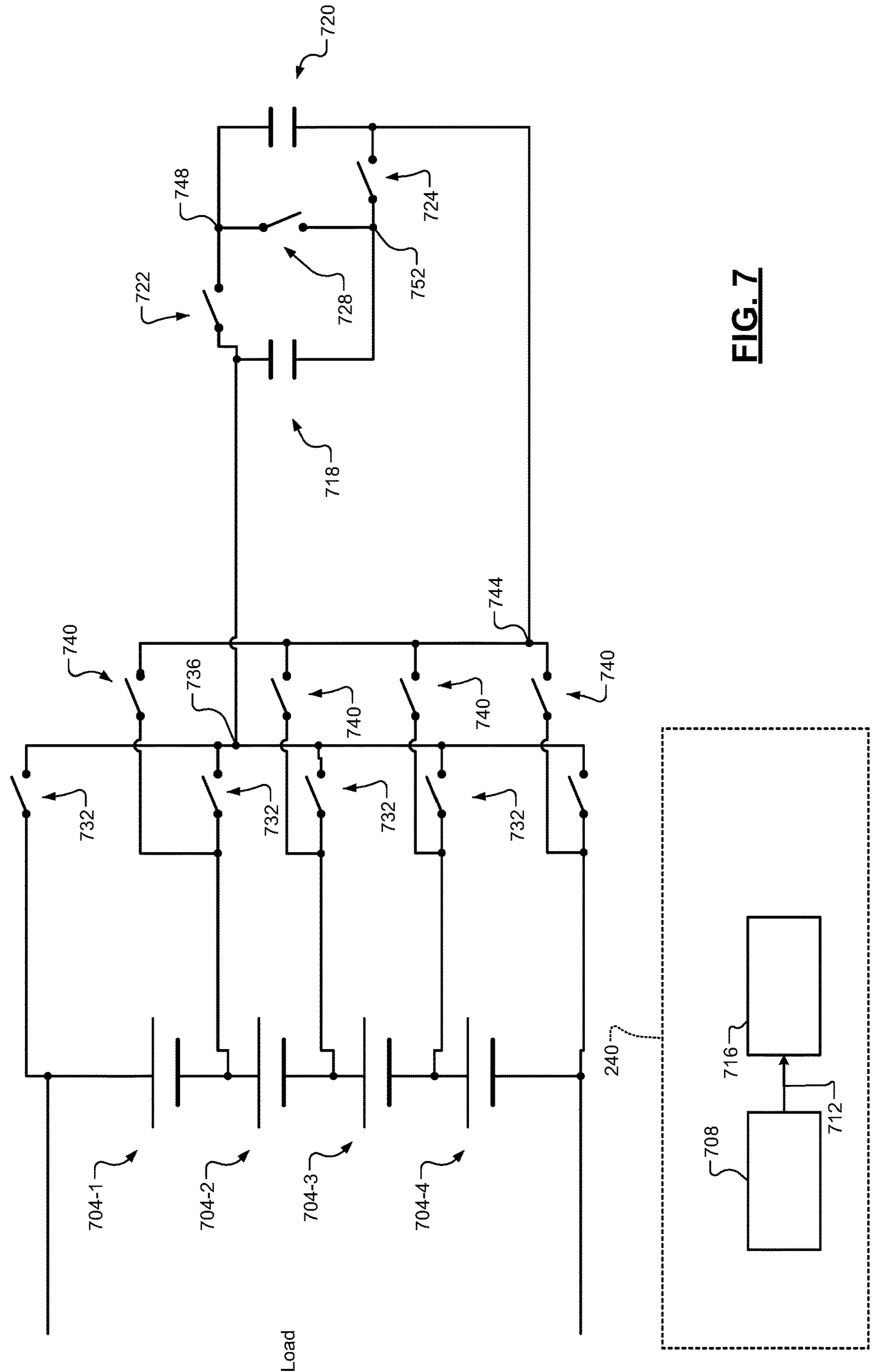
FIG. 7 is a functional block diagram of an example SOC balancing system.

FIG. 7 is a functional block diagram of an example SOC balancing system. 704-1, 704-2, 704-3, 704-4 collectively illustrate battery cells, battery strings, or battery modules (collectively referred to as batteries). For simplicity, however, 704-1, 704-2, 704-3, 704-N will be discussed as battery cells and collectively be referenced 704. While the example of 4 battery cells 704 is shown, the present application is also applicable to 2, 3, 4, and other higher numbers of battery cells that are electrically connected in series.

A state of charge (SOC) module 708 determines a present state of charge (SOC) 712 of each of the battery cells 704. In other words, the SOC module 708 determines present SOCs 712 of the battery cells 704, respectively. The SOC module 708 may determine the present SOC of a battery cell, for example, based on at least one of a voltage across the battery cell and current to and from that battery cell. The SOC module 708 may determine the present SOC of a battery cell using at least one of an equation and a lookup table that relates voltage and/or current to SOC. In various implementations, the SOC module 708 may determine the SOC of a battery cell based on an impedance of the battery cell, such as to more precisely relate voltage and current to SOC. The SOC module 708 does this for each battery cell. Temperatures, voltages, and currents of the battery cells 704 may be measured using temperature, voltage, and current sensors, respectively. The SOC of a battery cell may correspond to a ratio of a remaining charge of the battery cell divided by a maximum charge of the battery cell.

A switching module 716 controls switching of various switches to balance the SOCs of the battery cells 704. Generally speaking, the switching module 716 controls switches to discharge one of the battery cell 704 having a high SOC to (and charging) capacitors 718 and 720 that are electrically connected in parallel. The switching module 716 electrically connects the capacitors 720 in parallel by closing switches 722 and 724 and opening switch 728.

After discharging the battery cell with the high SOC and charging the capacitors 718 and 720, the switching module 716 stops the discharging of the battery cell and the charging of the capacitors 718 and 720. The switching module 716 electrically connects the capacitors 718 and 720 in series and discharges the series connected capacitors 718 and 720 to another one of the battery cells 704 with a low SOC. The switching module 716 electrically connects the capacitors 718 and 720 in series by opening the switches 722 and 724 and closing the switch 728. After charging the battery cell with the low SOC and discharging the capacitors 718 and 720, the switching module 716 stops the charging of the battery cell and the discharging of the capacitors 718 and 720. This makes the SOCs of the battery cells (with the previously high and low SOCs) more equal to each other and to the SOCs of other ones of the battery cells 704.

High side switches 732 electrically connect and disconnect the positive (high side) terminals of the battery cells 704, respectively, with a node 736. Low side switches 740 electrically connect and disconnect the negative (low side) terminals of the battery cells 704, respectively, with a node 744.

A first end of the capacitor 718 is electrically connected to the node 736. The switch 722 electrically connects and disconnects a node 748 to and from the node 736. A first end of the capacitor 720 is electrically connected to the node 748. A second end of the capacitor 718 is electrically connected to a node 752. The switch 724 electrically connects and disconnects the node 752 to and from a second end of the capacitor 720 and the node 744. The switch 728 electrically connects and disconnects the node 748 to and from the node 752. The switch 728 may be closed and the switches 722 and 724 may be opened to electrically connect the capacitors 718 and 720 in series.

Figure 8:
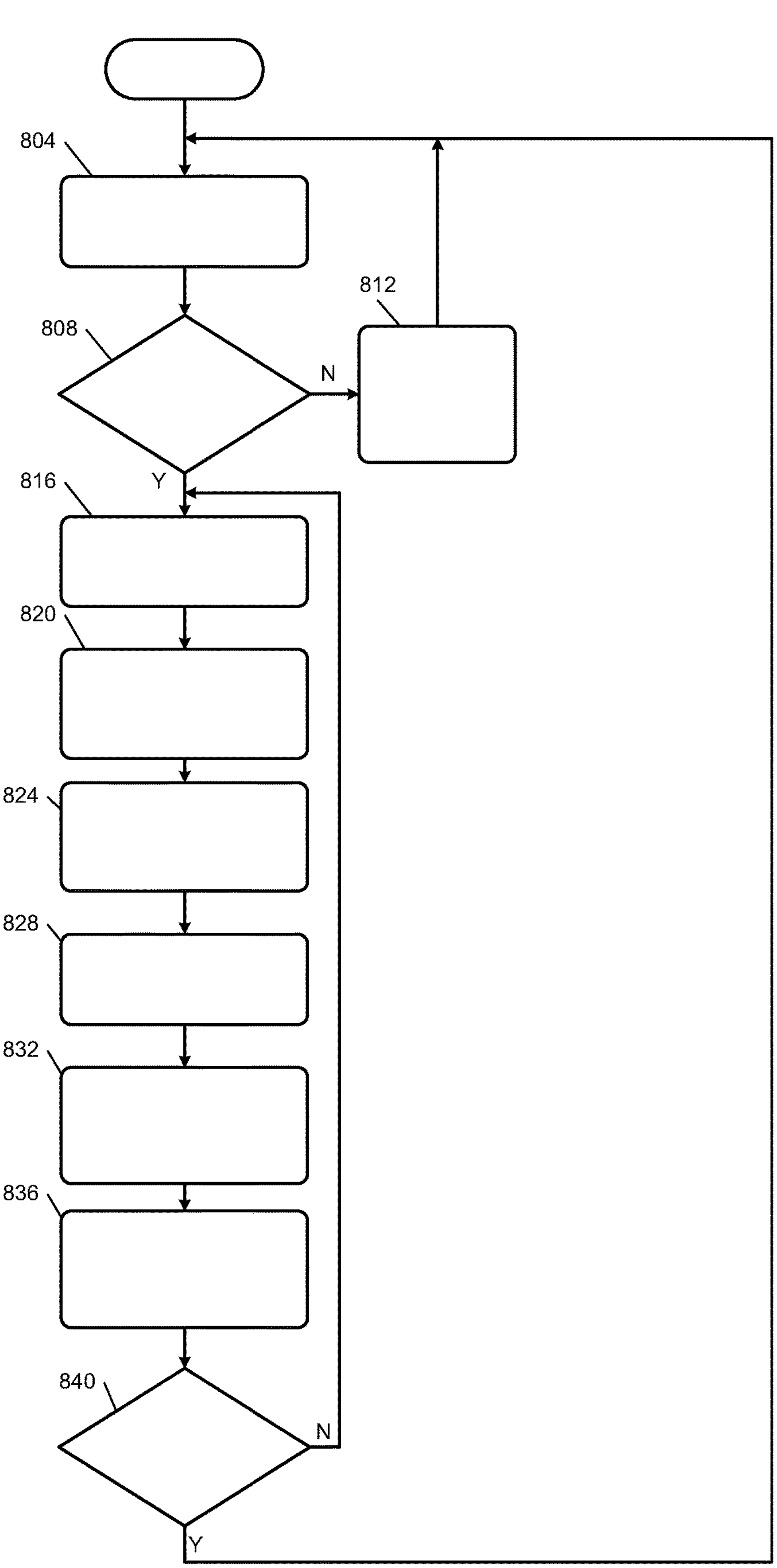
FIG. 8 is a flowchart depicting an example method of balancing the SOCs of the battery cells.

FIG. 8 is a flowchart depicting an example method of balancing the SOCs of the battery cells 704. Control begins with 804 where the SOC module 708 determines the SOCs 712 of the battery cells 704, respectively. At 708, the switching module 716 determines whether the difference (delta) between two of the SOCs 712 of any two of the battery cells 704, respectively, is greater than a first predetermined value (Value 1). The first predetermined value may be calibrated and may be, for example, approximately 5% SOC or another suitable value. If 708 is false, the switching module 716 continues with normal operation at 812, and control returns to 804. If 808 is true, control continues with 816.

At 816, the switching module 716 closes the switches 722 and 724 and electrically connects the capacitors 718 and 720 in parallel. At 820, the switching module 716 connects the one of the battery cells 704 (of the two with the difference in SOC) with the higher SOC with the parallel connected capacitors 718 and 720. The switching module 716 connects the one of the battery cells 704 with the parallel connected capacitors 718 and 720 by closing the high and low side switches 732 and 740 of that one of the battery cells 704.

Figure 9:
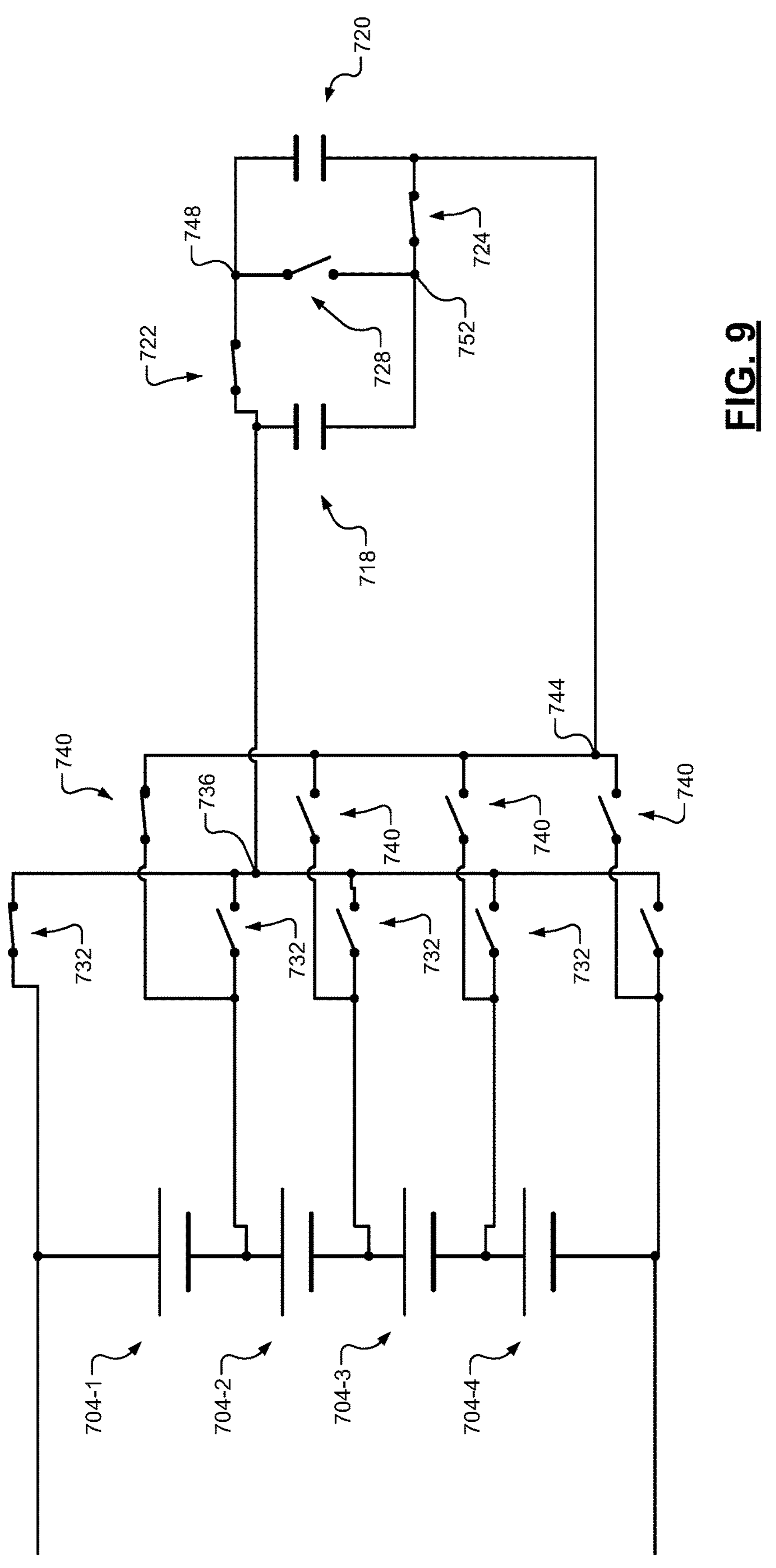
FIGS. 9-12 include example schematics illustrative of switch configurations for SOC balancing.

FIG. 9 is a schematic illustrating the example system of FIG. 7. In the example of FIGS. 9-12, the battery cell 704-1 initially has the higher SOC and the battery cell 704-4 has the lower SOC. FIG. 9 illustrates example switch states to discharge the battery cell 704-1 with the higher SOC to the parallel connected capacitors 718 and 720.

Figure 10:
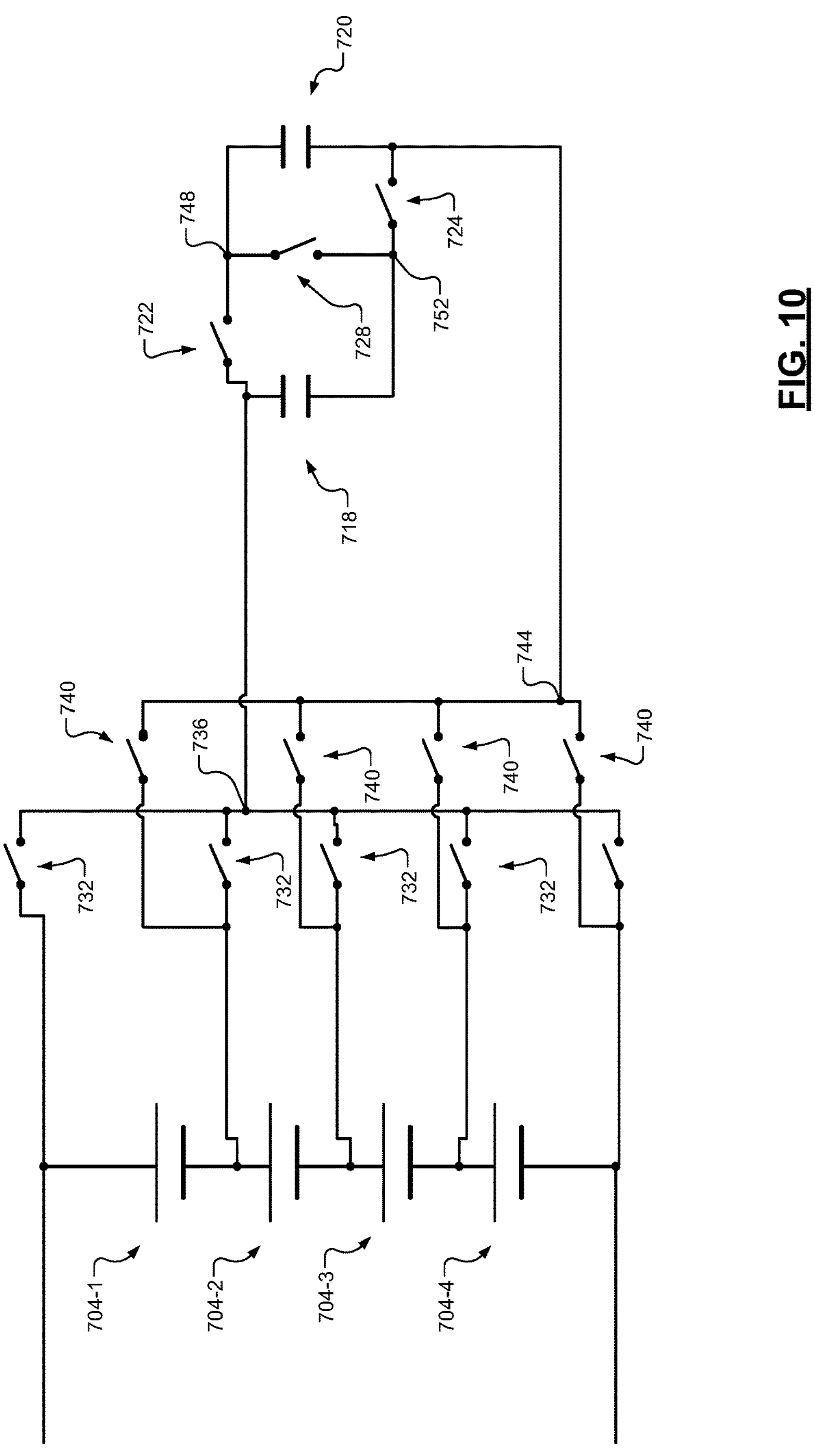

Referring back to FIG. 8, at 824, the switching module 726 opens the high and low side switches 732 and 740 and opens the switches 722 and 724. This disconnects the one of the battery cells from the capacitors, and discontinues the parallel connection of the capacitors 718 and 720. FIG. 10 includes an example of the switch configuration at this time.

Figure 11:
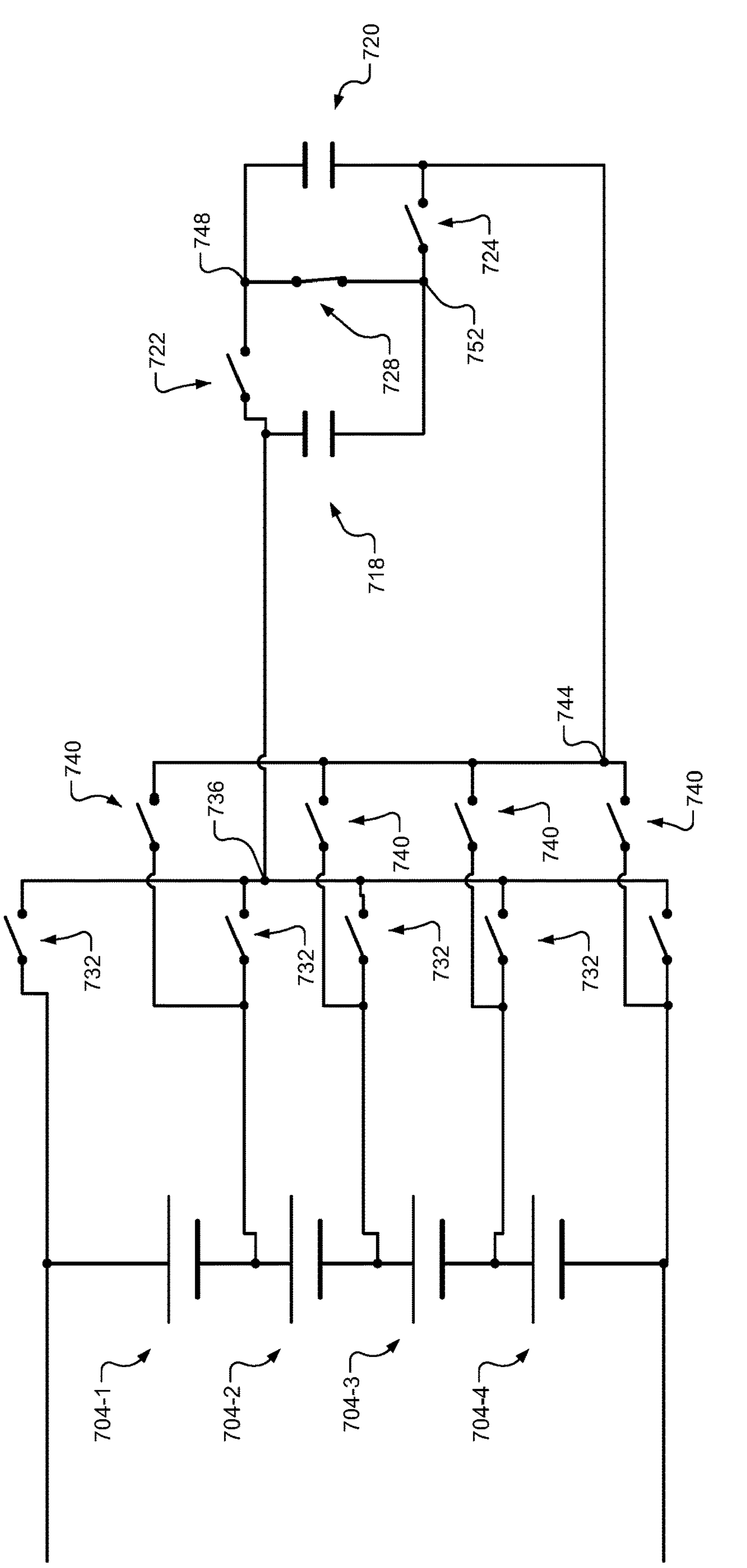

At 828, the switching module 726 closes the switch 728 and connects the capacitors 718 and 720 in series. FIG. 11 includes an example of the switch configuration at this time.

Figure 12:
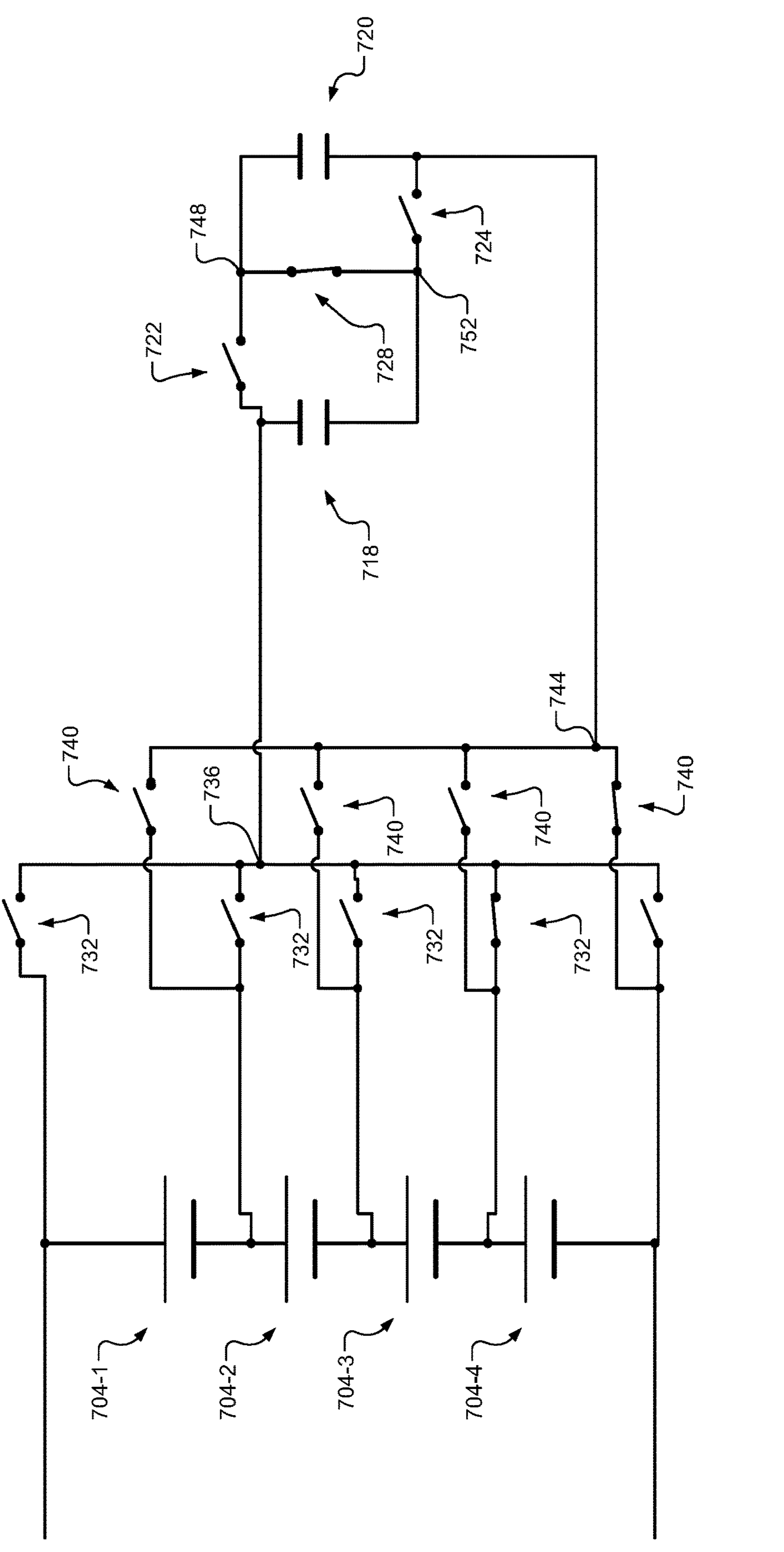

At 832, the switching module 716 connects the other one of the battery cells 704 (of the two with the difference in SOC) with the lower SOC with the series connected capacitors 718 and 720. The switching module 716 connects the one of the battery cells 704 with the series connected capacitors 718 and 720 by closing the high and low side switches 732 and 740 of that one of the battery cells 704. As stated above, in the example of FIGS. 9-12, the battery cell 704-1 initially has the higher SOC and the battery cell 704-4 has the lower SOC. FIG. 12 illustrates example switch states to discharge the capacitors 718 and 720 to the battery cell 704-4 and charge the battery cell 704-4 that initially had the lower SOC. This balances the SOCs of the battery cell 704-1 and 704-4 by increasing the SOC of the battery cell 704-4 and decreasing the SOC of the battery cell 704-1.

At 836, the SOC module 708 may update the SOCs of the battery cells 704, respectively, including the SOCs of the two of the battery cells 704 that initially had the difference in SOC that was greater than the first predetermined value. At 840, the switching module 716 determines whether the difference (delta) between the two of the SOCs 712 of the same two of the battery cells 704, respectively, is less than a second predetermined value (Value 2). The second predetermined value is less than the first predetermined value may be calibrated and may be, for example, approximately 1% SOC or another suitable value. If 840 is false, control returns to 816 and continues to balance the SOCs of those two battery cells. If 840 is true, control returns to 804. While the example of determining whether the difference between the two SOCs is provided, 840 may additionally or alternatively involve determining whether the voltages of the same two of the battery cells 704 is less than a predetermined voltage. The predetermined voltage may be calibratable and may be, for example, approximately 0.02 volts or another suitable value.

Balancing the SOCs of battery cells using the capacitors 718 and 720 as described above is faster than directly charging one battery cell using another battery cell to balance the SOCs of those two battery cells as charging parallel capacitors is faster than directly charging one battery cell with another. Charging a battery cell from the then charged series connected capacitors is also faster than directly charging one battery cell with another.

In various implementations, the capacitors 718 and 720 may be included in capacitor assisted battery (CAB) cells. CABs are specifically designed high power cells that include properties of capacitors including faster charging and discharging.

In various implementations, the capacitors 718 and 720 may be metal oxide capacitors, where the metal may be, for example, cobalt, ruthenium, or niobium. In various implementations, the capacitors 718 and 720 may be metal sulfides, such as titanium sulfide, copper sulfide, or iron sulfide. In various implementations, the capacitors 718 and 720 may be carbon based capacitors including, for example, activated carbon, graphene, or carbon nanotubes. In various implementations, the capacitors 718 and 720 may be polymer capacitors, such as including polyaniline or polyacetylene. In various implementations, the capacitors may be physical capacitors or include a combination of two or more of the above.

In various implementations, cathodes of the battery cells 704 may include olivine compounds, rock salt cobalt free layered oxide, rock salt layered oxides, spinel cathode, tavorite compounds, borate compounds, silicate compounds, organic compounds, and/or one or more other materials.

In various implementations, anodes of the battery cells 704 may include carbonaceous material, silicon/graphite, silicon oxide/graphite, silicon alloy/graphite, lithium metal, lithium alloy, tin, tin alloy, lithium titanium oxide, metal oxide, metal sulfide, silicon, silicon alloy, silicon graphite, lithiated silicon, and/or one or more other materials.

Figure 13:
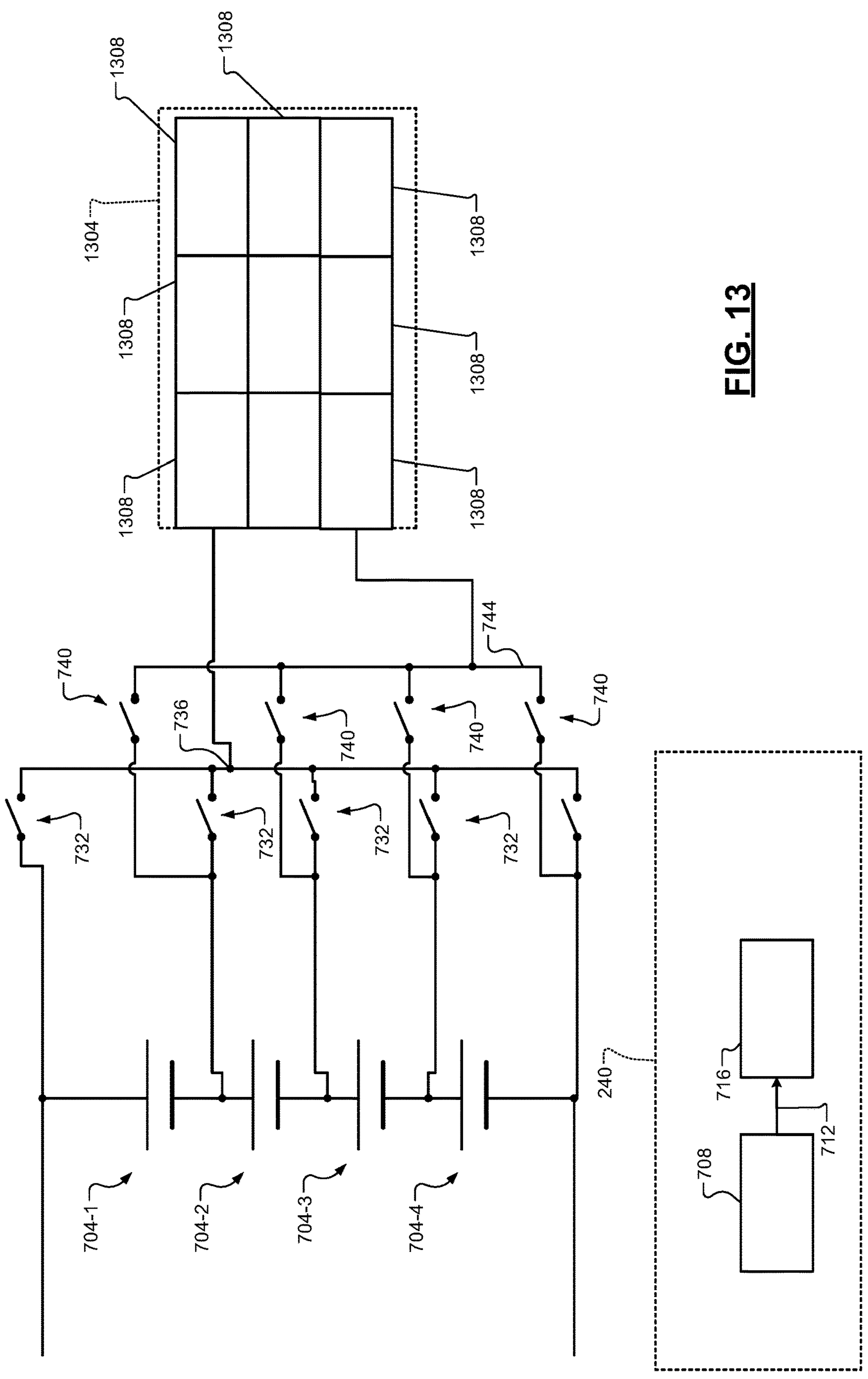
FIG. 13 includes a functional block diagram of an example implementation of balancing the SOCs of the battery cells using battery modules having CAB cells of a battery pack, such as the battery modules of FIGS. 4-6.

FIG. 13 includes a functional block diagram of an example implementation of balancing the SOCs of the battery cells using battery modules 1308 having CAB cells of a battery pack 1304, such as the battery modules of FIGS.

Figure 14:
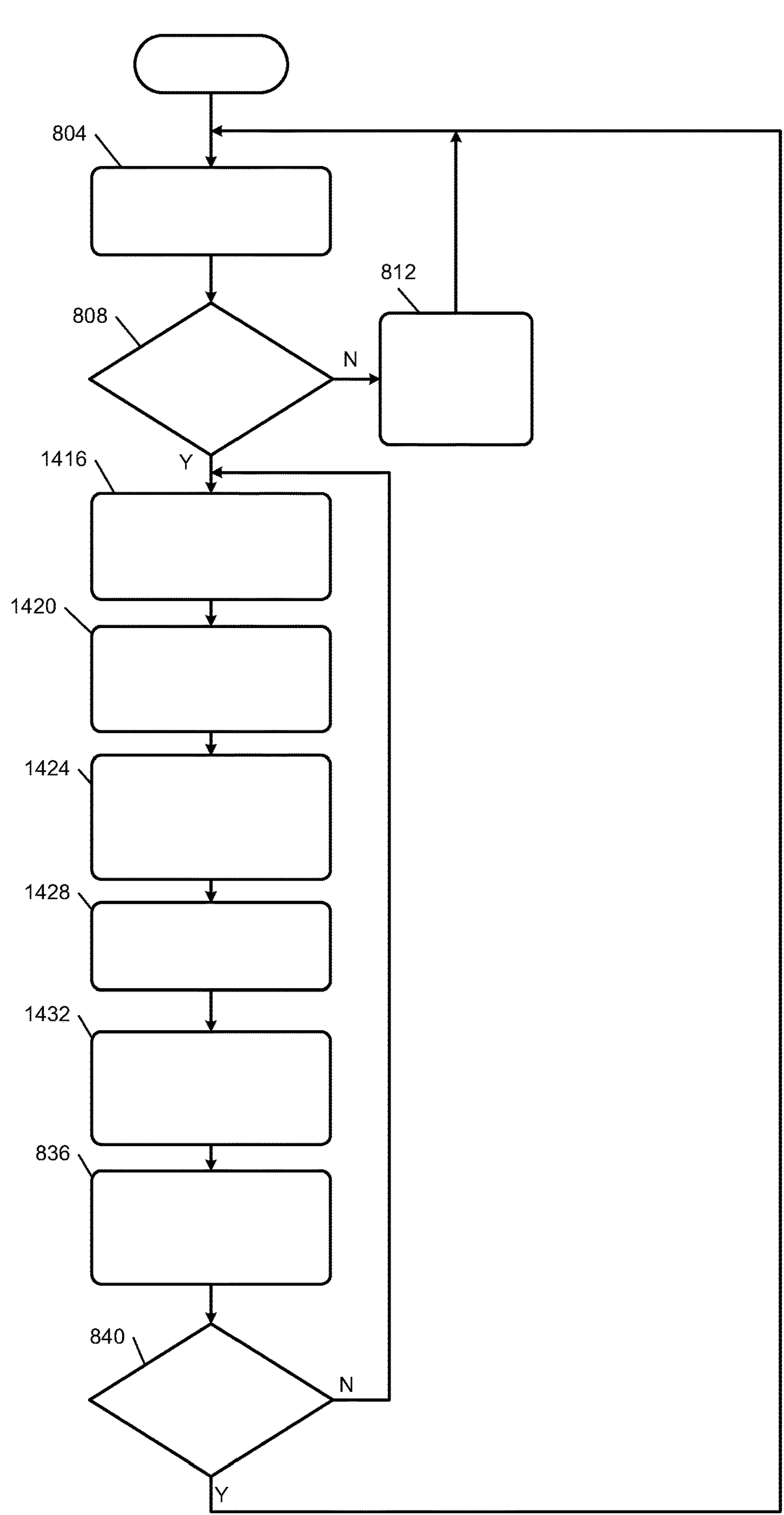
FIG. 14 is a flowchart depicting an example method of balancing the SOCs of battery cells using the battery modules with CAB cells.

4-6. FIG. 14 is a flowchart depicting an example method of balancing the SOCs of battery cells using the battery modules 1308 with CAB cells.

804-812 are performed as described above. While FIG. 14 is discussed regarding balancing SOCs of battery cells, FIG. 14 is also applicable to balancing the SOCs of battery modules. If 808 is true, control continues with 1416. At 1416, the switch switching module 716 operates one or more of the battery modules 1308 with CAB cells in a low voltage mode (e.g., the P mode discussed above with respect to FIG. 6), thereby connecting the strings of those one or more battery modules in parallel.

At 1420, the switching module 716 connects the one of the battery cells 704 (of the two with the difference in SOC) with the higher SOC with the one or more battery modules 1308 that are operating in the low voltage mode. At 1424, the switching module 726 disconnects the two battery cells with the difference in SOC from the battery module(s) that was/were charged. The switching module 726 may also discontinue the low voltage mode operation of the battery module(s). For example, the switching module 726 may operate the battery module(s) in the X (open) mode, such as illustrated in the example of FIG. 4.

At 1428, the switching module 726 operates the battery module(s) 1308 in a high power mode (e.g., the S mode discussed above with respect to FIG. 5), thereby connecting the strings of those one or more battery modules in series. At 1432, the switching module 716 connects the other one of the battery cells 704 (of the two with the difference in SOC) with the lower SOC with the battery module(s) 1308 that are in operating in the high power mode to charge that one of the battery cells 704. The switching module 716 connects the one of the battery cells 704 with the series connected capacitors 718 and 720 by closing the high and low side switches 732 and 740 of that one of the battery cells 704. This balances the SOCs of the battery cell 704 that previously had different SOCs.

At 836, the SOC module 708 may update the SOCs of the battery cells 704, respectively, including the SOCs of the two of the battery cells 704 that initially had the difference in SOC that was greater than the first predetermined value. At 840, the switching module 716 determines whether the difference (delta) between the two of the SOCs 712 of the same two of the battery cells 704, respectively, is less than a second predetermined value (Value 2). The second predetermined value is less than the first predetermined value may be calibrated and may be, for example, approximately 1% SOC or another suitable value. If 840 is false, control returns to 1416 and continues to balance the SOCs of those two battery cells. If 840 is true, control returns to 804. While the example of determining whether the difference between the two SOCs is provided, 840 may additionally or alternatively involve determining whether the voltages of the same two of the battery cells 704 is less than a predetermined voltage. The predetermined voltage may be calibratable and may be, for example, approximately 0.02 volts or another suitable value.

In this manner, CAB may be used to balance battery modules SOCs where a battery pack including modules with CABs are used in place of the two capacitors discussed above as the two capacitors may not have enough capacity to balance the SOCs of two battery modules. For battery cell SOC balancing, using the two capacitors may be advantageous relative to CABs.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A state of charge (SOC) balancing system, comprising:

a first battery having a first positive terminal and a first negative terminal;

a second battery having a second positive terminal and a second negative terminal and connected in series with the first battery;

a first switch configured to connect and disconnect the first positive terminal to and from a first node;

a second switch configured to connect and disconnect the second positive terminal to and from the first node;

a third switch configured to connect and disconnect the first negative terminal to and from a second node;

a fourth switch configured to connect and disconnect the second negative terminal to and from the second node;

a first capacitor having a first end connected to the first node and a second end connected to a third node;

a fifth switch configured to connect and disconnect the first node to and from a fourth node;

a sixth switch configured to connect and disconnect the fourth node to and from the third node;

a seventh switch configured to connect and disconnect the third node to and from the second node;

a second capacitor having a first end connected the fourth node and a second end connected to the second node;

a state of charge module configured to determine first and second states of charge of the first and second batteries, respectively; and a switching module configured to selectively, when the first SOC of the first battery is greater than the second SOC of the second battery:

(i) close the fifth and seventh switches, close the first and third switches, and open the second, fourth, and sixth switches;

(ii) after (i), open the fifth, seventh, first, and third switches;

(iii) after (ii), close the sixth switch, close the second and fourth switches, and open the first, third, fifth, and seventh switches; and (iv) after (iii), open the first, second, third, fourth, fifth, sixth, and seventh switches.

2. The system of claim 1 wherein the switching module is configured to perform (i)-(iv) when the first SOC of the first battery is greater than the second SOC of the second battery by at least a first predetermined SOC.

3. The system of claim 2 wherein the switching module is configured to repeat (i)-(iv) when a difference between the first SOC and the second SOC is greater than a second predetermined SOC after (iv).

4. The system of claim 3 wherein the first predetermined SOC is greater than the second predetermined SOC.

5. The system of claim 3 wherein the switching module is configured to repeat (i)-(iv) until the difference between the first SOC and the second SOC is less than the second predetermined SOC after (iv).

6. The system of claim 1 wherein:

the first battery is a first battery cell; and the second battery is a second battery cell.

7. The system of claim 1 wherein:

the first battery is a first battery string including a first plurality of battery cells; and the second battery is a second battery string including a second plurality of battery cells.

8. The system of claim 1 wherein:

the first battery is a first battery module including a first plurality of battery cells; and the second battery is a second module including a second plurality of battery cells.

9. The system of claim 1 wherein:

the first capacitor is a first capacitor assisted battery (CAB); and the second capacitor is a second CAB.

10. A state of charge (SOC) balancing system, comprising:

a first battery;

a second battery;

a first capacitor;

a second capacitor;

a state of charge module configured to determine first and second states of charge of the first and second batteries, respectively; and a switching module configured to selectively, when the first SOC of the first battery is greater than the second SOC of the second battery:

(i) electrically connect the first and second capacitors in parallel;

(ii) after (i), electrically connect the first battery to the first and second capacitors while the first and second capacitors are electrically connected in parallel;

(iii) after (ii), electrically disconnect the first battery from the first and second capacitors;

(iv) after (iii), electrically connect the first and second capacitors in series;

(v) after (iv), electrically connect the second battery to the first and second capacitors while the first and second capacitors are electrically connected in series; and (vi) after (v), electrically disconnect the second battery from the first and second capacitors.

11. The system of claim 10 wherein the switching module is configured to perform (i)-(vi) when the first SOC of the first battery is greater than the second SOC of the second battery by at least a first predetermined SOC.

12. The system of claim 1 wherein the switching module is configured to repeat (i)-(vi) when a difference between the first SOC and the second SOC is greater than a second predetermined SOC after (vi).

13. The system of claim 12 wherein the first predetermined SOC is greater than the second predetermined SOC.

14. The system of claim 12 wherein the switching module is configured to repeat (i)-(vi) until the difference between the first SOC and the second SOC is less than the second predetermined SOC after (vi).

15. The system of claim 10 wherein:

the first battery is a first battery cell; and the second battery is a second battery cell.

16. The system of claim 10 wherein:

the first battery is a first battery string including a first plurality of battery cells; and the second battery is a second battery string including a second plurality of battery cells.

17. The system of claim 10 wherein:

the first battery is a first battery module including a first plurality of battery cells; and the second battery is a second module including a second plurality of battery cells.

18. The system of claim 10 wherein:

the first capacitor is a first capacitor assisted battery (CAB); and the second capacitor is a second CAB.

19. A state of charge (SOC) balancing method, comprising:

determining first and second states of charge of first and second batteries, respectively, the first battery having a first positive terminal and a first negative terminal;

the second battery having a second positive terminal and a second negative terminal and connected in series with the first battery;

selectively, when the first SOC of the first battery is greater than the second SOC of the second battery:

(i) close fifth and seventh switches, close first and third switches, and open second, fourth, and sixth switches, where:

the first switch is configured to connect and disconnect the first positive terminal to and from a first node;

the second switch is configured to connect and disconnect the second positive terminal to and from the first node;

the third switch is configured to connect and disconnect the first negative terminal to and from a second node;

the fourth switch is configured to connect and disconnect the second negative terminal to and from the second node;

a first capacitor includes a first end connected to the first node and a second end connected to a third node;

the fifth switch is configured to connect and disconnect the first node to and from a fourth node;

the sixth switch is configured to connect and disconnect the fourth node to and from the third node;

the seventh switch is configured to connect and disconnect the third node to and from the second node; and a second capacitor includes a first end connected the fourth node and a second end connected to the second node;

(ii) after (i), open the fifth, seventh, first, and third switches;

(iii) after (ii), close the sixth switch, close the second and fourth switches, and open the first, third, fifth, and seventh switches; and (iv) after (iii), open the first, second, third, fourth, fifth, sixth, and seventh switches.

20. The method of claim 19 further comprising performing (i)-(iv) when the first SOC of the first battery is greater than the second SOC of the second battery by at least a first predetermined SOC.

* * * * *